United States Patent [19]

Moriga et al.

[11] Patent Number: 5,763,507
[45] Date of Patent: Jun. 9, 1998

[54] AQUEOUS PAINT

[75] Inventors: Toshinori Moriga, Tokyo; Shunji Kojima, Yokosuka; Seishichi Kobayashi, Yokohama, all of Japan

[73] Assignee: Toyo Seikan Kaisha, Ltd., Tokyo, Japan

[21] Appl. No.: 770,003

[22] Filed: Dec. 19, 1996

[30] Foreign Application Priority Data

Dec. 19, 1995 [JP] Japan ................... 7-330916

[51] Int. Cl.$^6$ ................... C08K 3/20; C08L 63/02
[52] U.S. Cl. ................... 523/424; 204/504; 205/315; 523/423
[58] Field of Search ................... 523/424, 423; 204/504; 205/315

[56] References Cited

U.S. PATENT DOCUMENTS 4,151,131  4/1979  Sekmakas et al. ................... 260/23
4,308,185  12/1981  Evans et al. ................... 525/63

*Primary Examiner*—Melvyn I. Marquis
*Assistant Examiner*—D. Aylward
*Attorney, Agent, or Firm*—Sughrue, Mion, Zinn, Macpeak & Seas, PLLC

[57] ABSTRACT

An aqueous paint which exhibits improved dispersion property in the water and dispersion stability, has a low viscosity enabling the painting operation to be efficiently carried out, and cures at low temperatures within short periods of time to form a coating which after cured exhibits high degree of workability, high corrosion resistance, and elutes out little into the content. The aqueous paint comprises an epoxy acrylate resin prepared by modifying, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2, and a curing agent of a thermosetting resin having a methylol group.

11 Claims, No Drawings

AQUEOUS PAINT

BACKGROUND OF THE INVENTION

1. Field of the Invention

The present invention relates to an aqueous paint of the type of an epoxy acrylate resin. More specifically, the invention relates to an aqueous paint comprising an epoxy acrylate resin prepared by modifying, with a (meth)acrylic monomer, a copolymerized epoxy resin containing, as phenolic components, a bisphenol-A component and a bisphenol-F component. The aqueous paint enables the coating operation to be efficiently carried out, maintains excellent environmental hygiene standards, and cures at low temperatures within short periods of time to form a film which after cured exhibits high degree of workability, high corrosion resistance, and elutes out little into the content.

2. Prior Art

In the can-producing industries, an organic coating for protecting a metal must satisfy both workability and corrosion resistance in combination. That is, in producing can closures and can barrels, the coated metal plate is subjected to the working. In producing can closures such as-of easy-open ends, etc., the coated metal plate is subjected to severe workings such as score working, riveting, etc. In the case of producing can barrels, the coated metal plate is subjected to severe machining such as high degree of drawing, multiple necking, beading, etc. Therefore, the organic coating must offer sufficient degree of workability as well as excellent corrosion resistance after the working An epoxy paint has heretofore been widely used for producing cans satisfying excellent workability and offering practicable properties such as corrosion resistance and resistance against chemicals. In order to improve the workability of the epoxy paint, furthermore, means have been employed such as increasing the molecular weight of the epoxy resin and decreasing the ratio of the curing resin with respect to the epoxy resin.

It has been proposed already to use the epoxy paint as an aqueous emulsion-type paint. For instance, Japanese Laid-Open Patent Publication No. 275675/1988 discloses an aqueous paint for cans comprising a thermosetting resin serving as a coating-forming component containing an epoxy resin component and a curing resin component for the epoxy resin component, and a carboxyl group-containing acrylic resin as a high molecular dispersing agent, the carboxyl group in said acrylic resin being present in the form of at least one kind of amine salt selected from the group consisting of alkylamines having a branched-chain alkyl group and a heterocyclic amine and in such an amount that the acid value thereof is from 2 to 30 on the basis of the paint resin component, and at least the thermosetting resin being present in the form of an O/W emulsion.

Japanese Laid-Open Patent Publication No. 145345/1995 filed by the present inventors discloses an epoxy paint comprising phenols in which not less than 90 mol % are binuclide phenols represented by the formula (1)

$$\text{HO}-\Phi-\text{CH}_2\Phi-\text{OH} \qquad (1)$$

wherein Φ is a phenylene group, and in which 20 to 50 mol % of the binuclide phenols have para-para-methylene bond; an epoxy resin derived from an epihalohydrin; and an epoxy paint containing a curing agent of a thermosetting resin having a methylol group, and further discloses an epoxy paint containing the above-mentioned epoxy resin and the curing agent of a thermosetting resin having a methylol group emulsified in an aqueous medium due to the self-emulsifying action based upon the neutralization of an acrylic resin component that is present therein.

The above-mentioned countermeasures, however, still leave room for improvement from the standpoint of quality of the coating. That is, according to the former means, the adhesiveness of the coating decreases with an increase in the molecular weight of the epoxy resin; i.e., the coating floats after the sterilization by heating and the coated can loses corrosion resistance. According to the latter means, the moisture or the corrosive components easily permeate from the content into the metal as the ratio of the epoxy resin component increases, and the coated can loses corrosion resistance. Moreover, the epoxy resin components of low molecular weights remain uncured in the finally cured coating and elute out into the content, which is not desirable from the standpoint of sanitation and retaining flavor.

In the can-producing industries, there is a constant demand for improving the workability of the coated metal plate. In the case of, for example, can closures such as easy-open ends and the like, the coating tends to be damaged by score working, riveting, etc. Correction coating is applied to the damaged portions requiring, however, an increased number of steps and an increased cost of production. In this field of industries, therefore, it has been desired to develop a paint that does not require correction coating.

The above-mentioned Japanese Laid-Open Patent Publication No. 145345/1995 is meaningful in providing an epoxy paint featuring excellent workability and corrosion resistance but still fails to satisfy the above-mentioned requirement.

Desirably, furthermore, the coating on a metal plate be baked at a temperature as low as possible. That is, baking the coating at a high temperature may damage the metal such as aluminum.

Therefore, the object of the present invention is to provide an aqueous epoxy paint which exhibits excellent dispersion property and dispersion stability in the water, exhibits low viscosity enabling the coating operation to be efficiently carried out, and is cured at low temperatures within short periods of time forming the coating which after cured exhibits high degree of workability, corrosion resistance, and elutes out little into the content.

Another object of the present invention is to provide an aqueous paint which can be adapted to coil-coating the can closures, and features high degree of workability and corrosion resistance.

According to the present invention, there is provided an aqueous paint comprising (A) an epoxy acrylate resin prepared by modifying, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2, and (B) a curing agent of a thermosetting resin having a methylol group.

It is desired that the copolymerized epoxy resin used for forming the epoxy acrylate resin is obtained by the polycondensation of (1) a diglycidyl ether of a bisphenol-A, and (2) a bisphenol-F or a mixture of the bisphenol-F and the bisphenol-A.

It is further desired that the bisphenol-F for forming the copolymerized epoxy resin is a composition at least 60 mol % of which comprises a bisphenol-F having ortho-ortho or ortho-para methylene bond.

It is further desired that the copolymerized epoxy resin comprises less than 2% by weight of a component having a molecular weight of not more than 1,000.

It is desired that the copolymerized epoxy resin has an average number of epoxy groups of 0.6 to 1.5 per a molecule.

The copolymerized epoxy resin can be modified with a (meth)acrylic monomer by any means that will be described later In general, however, it is desired that the copolymerized epoxy resin and the acrylic resin are present at a weight ratio of from 90:10 to 75:25. It is desired that the epoxy acrylate resin is obtained by graft-polymerizing an ethylenically unsaturated monomer comprising a (methyacrylic acid as an essential component onto said copolymerized epoxy resin.

Though there is no particular limitation, it is desired that the ethylenically unsaturated monomer is a composition comprising (i) 60 to 70% by weight of a (meth)acrylic acid, (ii) 30 to 40% by weight of a styrene, and (iii) less than 1% of an ethyl acrylate.

It is desired that the curing agent of a thermosetting resin having a methylol group is a resol phenolic resin and, particularly, a resol phenolic resin obtained by the polycondensation of a bisphenol-F and a formaldehyde.

It is desired that the resol phenolic resin is present in an amount of 0.5 to 7 parts by weight per 100 parts by weight of the epoxy acrylate resin.

DETAILED DESCRIPTION OF THE INVENTION

The aqueous paint of the present invention comprises an epoxy acrylate resin and a curing agent of a thermosetting resin having a methylol group. Here, a distinguished feature resides in that the epoxy acrylate resin is prepared by modifying, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2. Use of the copolymerized epoxy resin modified with a (meth)acrylic monomer makes it possible to obtain a paint which exhibits excellent dispersion property and dispersion stability in the water, exhibits low viscosity enabling the coating operation to be efficiently carried out, and is cured at low temperatures within short periods of time to form a coating which after cured exhibits high degree of workability, corrosion resistance, and elutes out little into the content.

As will be described later, a paint containing the epoxy acrylate resin in which the bisphenol components in the epoxy resin are all bisphenol-A components (Comparative Example 7) exhibits dilatancy at a solid component concentration of 30%, and is poorly dispersed and is applied at a decreased efficiency. A paint containing the epoxy acrylate resin in which the molar ratio of the bisphenol-F components in the epoxy resin is lower than the range of the present invention (Comparative Example 1) exhibits dilatancy at the same concentration, and is poorly dispersed. On the other hand, a paint in which the molar ratio of the bisphenol-A component to the bisphenol-F component in the epoxy resin lies within the range of the present invention, exhibits a viscosity of as low as about 460 cps at the same concentration and disperses well, from which it is obvious that the paint of the present invention can be applied at an improved efficiency.

A paint in which the molar ratio of the bisphenol-F component in the bisphenol compounds is smaller than the range of the present invention (Comparative Examples 1, 7 and 13) permits the coating to be whitened during the retort-sterilization under the conditions of an attainable maximum temperature (PMT) of 240° C. for a period of 20 seconds. Therefore, the paint cannot be cured at low temperatures within short periods of time. Besides, the paint components elute out into the content during the retorting. The paint is not satisfactory, either, in regard to corrosion resistance at the worked portions.

On the other hand, a paint in which the molar ratio of the bisphenol-F component in the bisphenol components exceeds the range of the present invention (Comparative Example 8) is satisfactory in regard to maintaining the viscosity of the paint in a low range, but is not cured to a satisfactory degree at low temperatures within short periods of time. Under the conditions of an attainable maximum temperature (PMT) of 240° C. for a period 20 seconds, however, the coating is whitened during the retort-sterilization. During the retorting, furthermore, the paint components tend to elute out into the content. Besides, the coating loses corrosion resistance when the coated plate is subjected to the working to produce can closures, i.e., when the coated plate is subjected to the scoring, riveting or the like working.

The copolymerized epoxy resin used for the preparation of the epoxy acrylate resin of the present invention contains a bisphenol-A component and a bisphenol-F component at a molar ratio of from 5:5 to 8:2 and further has a number average molecular weight of from 8,000 to 15,000, which are important for accomplishing the above-mentioned properties in combination.

When the number average molecular weight of the copolymerized epoxy resin is smaller than the above-mentioned range (Comparative Example 4), the coating is whitened during the retorting and the paint components elute out into the content. Besides, the coating loses corrosion resistance when the coated plate is subjected to the working to produce can closures, i.e., when the coated plate is subjected to the scoring, riveting or the like working.

When the number average molecular weight of the copolymerized epoxy resin is larger than the above-mentioned range (Comparative Example 3), on the other hand, the coating is not whitened and the paint components do not elute out into the content. However, the paint is dispersed very poorly. Besides, the coating loses corrosion resistance when the coated plate is subjected to the working to produce can closures, i.e., when the coated plate is subjected to the scoring, riveting or the like working.

The copolymerized epoxy resin further contains less than 2% by weight of a component having a molecular weight of not more than 1,000, which is important for the coating after cured to exhibit high degree of workability, large corrosion resistance and small degree of elution into the content. As the content of the above-mentioned low-molecular component increases, these properties tend to decrease (Comparative Examples 1, 2 and 4 to 8).

It is important that the bisphenol-F which is a starting material of the copolymerized epoxy resin contains not less than 60 mol % of those having ortho-ortho or ortho-para methylene bond, from the standpoint of maintaining excellent coating operation while containing a small amount of a solvent and being cured at low temperatures within short periods of time. The paint using the epoxyacrylate resin prepared by modifying, with a (meth)acrylic monomer, a copolymerized epoxy resin containing the bisphenol-F component having less than 60 mol % of those having ortho-ortho or ortho-para bond, exhibits dilatancy, disperses poorly, and is not favorably cured at low temperatures (Comparative Example 5).

Unlike the ordinary bisepoxide, the copolymerized epoxy resin used for the preparation of the epoxy acrylate resin has a number of epoxy groups of less than 2 and, particularly, from 0.6 to 1.5 per a molecule. When the number of epoxy groups is less than 0.6 or larger than 1.5 per a molecule, the characteristics in combination become inferior to those of when the number of epoxy groups lies within the above-mentioned range (Comparative Examples 3, 6, 8 and 4).

The copolymerized epoxy resin can be modified with a (meth)acrylic monomer by any means that will be described later. In general, however, it is desired that the copolymerized epoxy resin and the acrylic resin are present at a weight ratio of from 90:10 to 75:25. It is desired that an ethylenically unsaturated monomer containing a (meth)acrylic acid as an essential component is graft-polymerized in the presence of at least part of the copolymerized epoxy resin.

When the content of the acrylic resin component is smaller than the above-mentioned range (Comparative Example 11), the paint disperses poorly. When the content of the acrylic resin component is larger than the above-mentioned range (Comparative Example 12), on the other hand, the coating lacks resistance against the water and the coating properties are all deteriorated.

It is desired that the epoxy acrylate resin is used in combination with a thermosetting resin having a methylol group, particularly, a resol phenolic resin and, most particularly, a resol phenolic resin obtained by the polycondensation of a bisphenol-F and a formaldehyde, and that the curing agent resin is used in an amount of 0.5 to 7 parts by weight per 100 parts by weight of the epoxy acrylate resin.

When the amount of the curing agent resin is smaller than the above-mentioned range, the coating exhibits poor resistance against the heat and water and exhibits insufficient corrosion resistance after working. The closure which uses this paint develops feathering (Comparative Example 10). When the amount of the curing agent resin is larger than the above-mentioned range, on the other hand, the paint components much elute out into the content and poor corrosion resistance is obtained after the working (Comparative Examples 9 and 13)

The copolymerized epoxy resin used for the preparation of an epoxy acrylate resin of the present invention may be the one obtained by any copolymerization method provided it contains a bisphenol-A component and a bisphenol-F component at a molar ratio of from 5:5 to 8:2. Preferably, the copolymerized epoxy resin should be the one obtained by the polycondensation of a diglycidyl ether of the bisphenol-A and a bisphenol-F or a mixture of the bisphenol-F and the bisphenol-A.

Described below first is the bisphenol-F used as a starting material of the copolymerized epoxy resin.

[Bisphenol-F]

The bisphenol-F is obtained by the reaction of a phenol with a formaldehyde. The reaction is carried out in the presence of an excess of phenol, such as at a molar ratio of phenol/formaldehyde of 3 to 6. As the catalyst, there is used a strong acid such as oxalic acid, hydrochloric acid, sulfuric acid, paratoluenesulfonic acid or phosphoric acid, or a salt or an oxide of a divalent metal. The reaction temperature is from 40 to 120° C. and the reaction time is from 30 minutes to about 4 hours. The formaldehyde is usually used in the form of an aqueous solution (formalin) at a concentration of 30 to 55%, and the phenol having a melting point of 40.9° C. is usually handled in the form of a liquid being mixed with a small amount of water. The pH during the reaction is adjusted to be from 1 to 7. Under the acidic condition where the pH is from 1 to 4, there is formed a bisphenol-F having much para-methylene bond. Under the weakly acidic condition where the pH is from 4 to 7, there is formed a bisphenol-F having much ortho-methylene bond when use is made of a salt or an oxide of a divalent metal such as Mn, Ca, Mg, Zn, Cd, Pb, Cu, Co, Ni or the like. Particularly preferred salts of divalent metals for obtaining the ortho-methylene bond are acetates of Zn, Mn, Mg, etc.

Water is separated and removed from the reaction suspension and, as required, the catalyst is neutralized and the product is washed with water. Next, in general, water is removed by distillation under normal pressure and the remaining phenol is removed by distillation under reduced pressure. The obtained bisphenol-F contains three kinds of binuclide phenols of 2,2'-, 2,4'- and 4,4'-dihydroxydiphenylmethanes, as well as polynuclides such as trinuclides, tetranuclides, etc. When the binuclide phenol only is to be refined, the distillation is effected under reduced pressure. It is further possible to isolate three kinds of binuclide phenols relying upon the distillation method or the recrystallization from the solvent. The bisphenol-F is usually refined by distillation but may be refined by recrystallization from the solvent without any problem. The solvent for recrystallization may be an alcohol such as butanol, acetone, benzene, toluene, or a mixture solvent thereof. The dimethylene ether bond by-produced in small amounts during the preparation of the bisphenol-F can be converted into a methylene bond by providing a heating stage of 150° to 160° C. during the refining.

The obtained bisphenol-F is analyzed by the high-speed liquid chromatography (HPLC) to isolate three kinds of binuclide phenols from polynuclides such as trinuclides, tetranuclides, etc. to determine the purity of the binuclides and the contents of three kinds of ortho-ortho, ortho-para and para-para methylene bonds. Silica treated with a dichlorodibutylsilane is used as a solid phase. As an eluent, furthermore, use is made of methanol/water, acetonitrile/water, methanol-acetonitrile mixture/water, or the like. A detector is based upon the ultraviolet ray absorption (UV), and the contents of components in the bisphenol-F are determined based on an idea that the peak areas vary in proportion to the weight concentration of the components. The ratio of ortho-ortho, ortho-para and para-para methylene bonds in the bisphenol-F can be measured and evaluated even relying upon the NMR method.

The bisphenol-F is represented by the following chemical formula (1).

HO—Φ—CH$_2$—Φ—OH　　(1)

wherein Φ is a phenylene group, and in which at least 60 mol % of which should be a bisphenol-F having ortho-ortho and ortho-para methylene bonds. The bisphenol-F which is easily available and is suited for the object of the present invention is a mixture containing 40 to 60 mol % of those having ortho-para methylene bond, 20 to 40 mol % of those having para-para methylene bond, and 10 to 20 mol % of those having ortho-ortho methylene bond.

[Copolymerized Epoxy Resin]

The epoxy resin used in the present invention is a copolymerized epoxy resin derived from a bisphenol-A, a bisphenol-F and an epichlorohydrin. A preferred copolymerized epoxy resin contains the bisphenol-A and the bisphenol-F at a molar ratio of from 5:5 to 8:2 and, particularly preferably, from 5:5 to 7:3, and having a number average molecular weight of 8,000 to 15,000 and, particularly preferably, from 10,000 to 14,000. When the content of the bisphenol-F in the copolymerized epoxy resin exceeds the above-mentioned range, the glass transition point (Tg) of the resin decreases and the coating loses resistance against the heat and water though the viscosity of the paint decreases. The coating tends to be whitened through the retort processing and permits water and ions to permeate through. Accordingly, the coating exhibits decreased corrosion resistance. When the content of the bisphenol-F becomes smaller than the above-mentioned range, the viscosity of the resin solution increases conspicuously and the solvent must be used in an increased amount to obtain a proper viscosity of the paint. Even when the number average molecular weight exceeds the above-mentioned range, the solvent must be used in a very large amount to obtain a proper viscosity of the paint. When the number average molecular weight is smaller than the above-mentioned range, the coating exhibits insufficient workability and loses corrosion resistance after the working. Moreover, curing property of the paint at low temperatures within short periods of time decreases with a decrease in the number average molecular weight. An increase in the amount of the curing agent to compensate for curing property results in a decrease in the workability and elution property.

The copolymerized epoxy resin can be obtained by the polycondensation of the bisphenol-A, bisphenol-F and epichlorohydrin through a one-stage polymerization method (taffy method) or by the polycondensation of the bisphenol-F, or by the polycondensation of the bisphenol-F and diglycidyl ether of the bisphenol-A and the bisphenol-A through the two-stage polymerization method (fusion method). In order to obtain the high molecular copolymerized epoxy resin having a number average molecular weight within the above-mentioned range, however, it is desired to polycondensate the diglycidyl ether of the bisphenol-A and the bisphenol-F or a mixture of the bisphenol-F and the bisphenol-A. The copolymerized epoxy resin polymerized through the one-stage polymerization method tends to exhibit a broadened molecular weight distribution as expressed by weight average molecular weight/number average molecular weight, poorly elutes since it contain low molecular components in large amounts and exhibits an increased viscosity when it is dissolved in a solution since it also contains ultra-high molecular components in large amounts, and makes it necessary to use the solvent in large amounts. Even in the former of the above-mentioned two-stage polymerization method, the copolymerized epoxy resin tends to elute more since it contains low molecular components in large amounts. The reason is attributed to that the former reaction product of the bisphenol-F or the diglycidyl ether of a mixture of the bisphenol-F and the bisphenol A with the bisphenol-A forms a cyclic dimer and a cyclic trimer in the initial stage of the reaction compared with the reaction product of the diglycidyl ether of the bisphenol-A with the bisphenol-F or the mixture of the bisphenol-F and the bisphenol-A. This can be implied from the structural features of a diglycidyl ether of a 2,2'-dihydroxydiphenylmethane and a 2,4'-dihydroxydiphenylmethane.

Purity of the starting materials used for the two-stage polymerization method plays an important role for obtaining a high molecular copolymerized epoxy resin having a number average molecular weight of 8,000 to 15,000. It is desired to use the bisphenol-A of a high purity having a melting point of 155° to 157° C. and to use the diglycidyl ether of the bisphenol-A having a high purity. It is desired to use, for example, a liquid bisphenol-A epoxy resin having a viscosity of 90 to 130 poises (25° C.) and an epoxy equivalent of from 175 to 190. Purity of the binuclide of the bisphenol-F plays a further important role. Desirably, the bisphenol-F has a binuclide purity of not smaller than 98% and, preferably, not smaller than 99%. When the starting materials that are used have poor purity, the molecular weight distribution is broadened. Therefore, even if the weight average molecular weight is increased, the resin contains considerable amounts of components of low polymerization degree, and the number average molecular weight in many cases fails to reach the above-mentioned range.

In order to obtain the copolymerized epoxy resin having a number average molecular weight lying within the above-mentioned range, furthermore, it is important to carry out the polymerization by using the diglycidyl ether of the bisphenol and the bisphenol at a molar ratio of about 1:1 (from 10:9 to 9:10). When the molar ratio of the starting materials lies outside the above-mentioned range, the number average molecular weight may not in many cases reach the above-mentioned range.

The copolymerized epoxy resin used in the present invention contains less than 2% by weight of a component having a molecular weight of not more than 1,000. The coating obtained from this resin exhibits excellent properties from the standpoint of elution and maintaining flavor. The conventional paint for producing cans had to be cured at a high temperature for an extended period of time to suppress the elution. By using a resin having small amounts of elution components, however, it is made possible to bake the coating at a low temperature for a short period of time.

One of the important requirements is that the copolymerized epoxy resin used in the present invention has a narrow molecular weight distribution which is not larger than 6 as represented by weight average molecular weight/number average molecular weight. When the molecular weight distribution exceeds 6, the viscosity of the paint so increases that the effect of decreasing the viscosity by blending the bisphenol-F is offset.

Another feature of the copolymerized epoxy resin used in the present invention is that an average number of the epoxy groups per an epoxy resin molecule which is found by dividing the number average molecular weight by the epoxy equivalent, is from 0.6 to 1.5 and, particularly, from 0.7 to 1.3. When the average number exceeds the above-mentioned range, inconvenience arises in regard to adhesiveness of the coating to the underlayer, workability, elution, etc.

In order to obtain a high molecular copolymerized epoxy resin which exhibits a low viscosity when it is dissolved in a solvent that is used in the present invention, the ratio of three kinds of isomers in the bisphenol-F plays an important role. It is desired that the content of the ortho-ortho or ortho-para methylene bond is not smaller than 60% and, particularly, not smaller than 68% (content of para-para methylene bond is smaller than 40% and, particularly, smaller than 32%). When the content of the ortho-ortho or ortho-para methylene bond is smaller than the above-mentioned range (when content of the para-para methylene bond is larger than the above-mentioned range), the viscosity of the solution is not sufficiently lowered, and a large reduction in the amount of the solvent cannot be expected compared with the paint using the conventional bisphenol-A epoxy resin.

Another reason why the aqueous paint of the present invention is cured at a low temperature within a short period of time resides in the copolymerized epoxy resin. The copolymerized epoxy resin has a high molecular weight and exhibits strikingly improved film property when a crosslinking reaction takes place even to a small degree as is widely known. Besides, the copolymerized epoxy resin uses a bisphenol-F containing large amounts of ortho-ortho or ortho-para methylene bond, and a p-position that exhibits high reactivity and that remains vacant participates in the curing reaction, which is another reason. The p-position that remains vacant on the copolymerized epoxy resin skeleton reacts directly with the methylol group or the etherified methylol group and further seems to react with the methylol group or the etherified methylol group via a formaldehyde that is by-produced during the curing reaction.

It was mentioned already why the copolymerized epoxy resin used in the present invention contains the bisphenol-A and the bisphenol-F at a molar ratio of from 5:5 to 8:2. There, however, is another reason for controlling the reactivity. When the bisphenol-F is contained in an amount in excess of the above-mentioned range, the coating sharply reacts even depending upon a slight difference in the baking conditions; i.e., it becomes difficult to obtain a coating of a predetermined quality. Or, the curing degree tends to be increased causing a large residual strain in the coating, and causing the adhesiveness and workability to decrease. When the content of the bisphenol-F is smaller than the above-mentioned range, on the other hand, the curing is not effected to a sufficient degree at a low temperature within a short period of time.

The polymerization reaction is continuously carried out by using an extruder or is batchwisely carried out by using a reaction oven. When the polymerization reaction is continuously carried out, a preferred polymerization temperature is from 170° to 250° C. and a preferred reaction time is from 0.01 to 0.06 hours. When the polymerization reaction is batchwisely carried out, a preferred temperature range is from 140° to 220° C. and a reaction time is from 1 to 8 hours.

The polymerization reaction can be carried out in the absence of a solvent or in the presence of a solvent. Preferred examples of the solvent used for the polymerization include glycol ether, alcohol, ketone, acetate, aromatic hydrocarbon and any combination thereof. Particularly preferred examples of the solvent include acetone, methyl ethyl ketone, methyl isobutyl ketone, methyl amyl ketone, diacetate alcohol, C1 to C4 alkyl ether of mono or dialkylene glycol such as n-methyl ether of ethylene glycol, methyl ether of ethylene glycol, n-butyl ether of propylene glycol, methyl ether of propylene glycol, n-butyl ether of diethylene glycol, methyl ether of diethylene glycol, n-butyl ether of dipropylene glycol or methyl ether of dipropylene glycol, 3-methyl-3-methoxybutanol, n-butanol, sec-butanol, isopropanol, butyl acetate, toluene, xylene, and any combination thereof.

It is desired that the solvent in the polymerization system is used in an amount of 0.1 to 20 parts and, particularly, 1 to 10 parts per 100 parts of the mixture of the starting materials. When a desired copolymerized epoxy resin is adjusted, the reaction can be terminated by diluting with a solvent particularly in the case of the batch system. When it becomes difficult to continue the stirring, the reaction can be further continued by lowering the viscosity by being diluted with a solvent.

A suitable catalyst used for the polymerization reaction will be, for example, a phosphonium compound such as phosphonium carboxylate, phosphonium carboxylate-carboxylic acid complex, phosphonium halide, phosphonium biscarbonate, phosphonium phosphate, and any combination thereof. Particularly preferred examples of the catalyst include ethyltriphenylphosphonium acetate-acetic acid complex, ethyltriphenylphosphonium phosphate, tetrabutylphosphonium acetate-acetic acid complex, tetrabutylphosphonium phosphate, and any combination thereof.

A catalyst represented by the following formula (2),

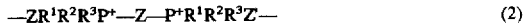

$$-ZR^1R^2R^3P^+\!-\!Z\!-\!P^+R^1R^2R^3Z- \quad (2)$$

wherein $R^1$, $R^2$ and $R^3$ are, independently of each other, aromatic groups or inert substituted aromatic groups, Z is a $-(C(R^4)_2)_2-$, $R^4$ are, independently of each other, hydrogen atoms or hydrocarbyl groups or inert substituted hydrocarbyl groups having 1 to 20, more preferably, 1 to 10, and most preferably, 1 to 4 carbon atoms, Z' is any desirable anion, a is a value of at least 4, preferably from 4 to 20, more preferably from 4 to 10, and most preferably, 4 to 6, can be preferably used, too.

A preferred inert substituent Z contains, for example, —CO—Cl, —CN and —OH.

Particularly preferred examples of the catalyst used in the present invention include tetramethylenebis (triphenylsulfonium chloride), tetramethylenebis (triphenylphosphonium iodide), tetramethylenebis (triphenylphosphonium bromide), pentamethylenebis (triphenylphosphonium chloride), pentamethylenebis (triphenylphosphonium iodide), pentamethylenebis (triphenylphosphonium bromide), hexamethylenebis (triphenylphosphonium iodide), hexamethylenebis (triphenylphosphonium chloride), hexamethylenebis (triphenylphosphonium bromide), heptamethylenebis (triphenylphosphonium chloride), heptamethylenebis (triphenylphosphonium bromide), tetramethylenebis (triphenylphosphonium acetate-acetic acid complex), pentamethylenebis(triphenylphosphonium acetate-acetic acid complex), hexamethylenebis (triphenylphosphonium acetate-acetic acid complex), heptamethylenebis (triphenylphosphonium acetate-acetic acid complex), tetramethylenebis(triphenylphosphonium phosphate), pentamethylenebis(triphenylphosphonium phosphate), hexamethylenebis(triphenylphosphonium phosphate), heptamethylenebis(triphenylsulfonium phosphate), tetramethylenebis(triphenylphosphonium) bicarbonate, pentamethylenebis(triphenylphosphonium) bicarbonate, hexamethylenebis(triphenylphosphonium) bicarbonate, heptamethylenebis(triphenylphosphonium) bicarbonate, tetramethylenebis(triphenylphosphonium) oxalate, pentamethylenebis(triphenylphosphonium) oxalate, hexamethylenebis(triphenylphosphonium) oxalate, heptamethylenebis(triphenylphosphonium) oxalate, and any combination thereof.

Furthermore, the catalyst that is preferably used is a phosphonium compound having three phenyl groups bonded to a phosphorus atom and a cycloalkyl group bonded to the phosphorus atom. The phosphonium compound may have any anion moiety. Particularly preferred examples of the anion include those from halide, chloride, bromide or iodide; carboxylate such as formate, acetate, oxalate, trifluoroacetate, carboxylate-carboxylic acid complex such as acetate-acetic acid complex; conjugated base of an inorganic acid such as bicarbonate, tetrafluoroborate or biphosphate; and conjugated base of a phenol such as phenate, or bisphenol or biphenol (e.g., bisphenol-A or bisphenol-F), and combinations thereof. The cycloalkyltriphenyl phosphonium catalyst is expressed by the following formula (3),

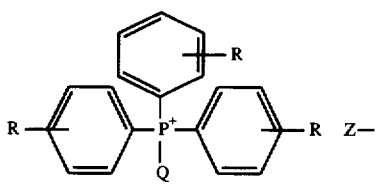

wherein Q is a cycloalkyl, alkyl or halo-substituted cycloalkyl group having preferably 3 to 8, more preferably 4 to 7, and most preferably 5 to 6 carbon atoms in the cycloalkyl ring; R are, independently from each other, hydrogen atoms, halogen atoms or hydrocarbyl groups having preferably 1 to 12, more preferably 1 to 6, and most preferably, 1 to 3 carbon atoms; Z is an anion from, for example, chloride, bromide or iodide, carboxylate such as formate, acetate, oxalate, trifluoroacetate, or carboxylate-carboxylic acid complex such as acetate-acetic acid complex, conjugated base of an inorganic acid such as bicarbonate, tetrafluoroborate or biphosphate, and conjugated salt of a phenol such as phenate, bisphenol or biphenol (e.g., bisphenol-A or bisphenol-F), and combinations thereof.

Particularly preferred examples of the catalyst include cyclopropyltriphenylphosphonium iodide, cyclopropyltriphenylphosphonium bromide, cyclopropyltriphenylphosphonium chloride, cyclopropyltriphenylphosphonium acetate, cyclopropyltriphenylphosphonium acetate-acetic acid complex, cyclopropyltriphenylphosphonium phosphate, cyclopropyltriphenylphosphonium heptanoate, cyclopropyltriphenylphosphonium oxalate, cyclobutyltriphenylphosphonium iodide, cyclobutyltriphenylphosphonium bromide, cyclobutyltriphenylphosphonium chloride, cyclobutyltriphenylphosphonium acetate, cyclobutyltriphenylphosphonium acetate-acetic acid complex, cyclobutyltriphenylphosphonium phosphate, cyclobutyltriphenylphosphonium heptanoate, cyclobutyltriphenylphosphonium oxalate, cyclopentyltriphenylphosphonium iodide, cyclopentyltriphenylphosphonium bromide, cyclopentyltriphenylphosphonium chloride, cyclopentyltriphenylphosphonium acetate, cyclopentyltriphenylphosphonium acetate-acetic acid complex, cyclopentyltriphenylphosphonium phosphate, cyclopentyltriphenylphosphonium heptanoate, cyclopentyltriphenylphosphonium oxalate, cyclopropyltriphenylphosphonium iodide, cyclopropyltriphenylphosphonium bromide, cyclopropyltriphenylphosphonium chloride, cyclopropyltriphenylphosphonium acetate, cyclopropyltriphenylphosphonium acetate-acetic acid complex, cyclopropyltriphenylphosphonium phosphate, cyclopropyltriphenylphosphonium heptanoate, cyclopropyltriphenylphosphonium oxalate, cyclohexyltriphenylphosphonium iodide, cyclohexyltriphenylphosphonium bromide, cyclohexyltriphenylphosphonium chloride, cyclohexyltriphenylphosphonium acetate, cyclohexyltriphenylphosphonium acetate-acetic acid complex, cyclohexyltriphenylphosphonium phosphate, cyclohexyltriphenylphosphonium oxalate, cycloheptyltriphenylphosphonium iodide, cycloheptyltriphenylphosphonium bromide, cycloheptyltriphenylphosphonium chloride, cycloheptyltriphenylphosphonium acetate, cycloheptyltriphenylphosphonium acetate-acetic acid complex, cycloheptyltriphenylphosphonium phosphate, cycloheptyltriphenylphosphonium heptanoate, cycloheptyltriphenylphosphonium oxalate, cyclooctyltriphenylphosphonium iodide, cyclooctyltriphenylphosphonium bromide, cyclooctyltriphenylphosphonium chloride, cyclooctyltriphenylphosphonium acetate, cyclooctyltriphenylphosphonium acetate-acetic acid complex, cyclooctyltriphenylphosphonium phosphate, cyclooctyltriphenylphosphonium heptanoate, cyclooctyltriphenylphosphonium oxalate, and combinations thereof.

The catalyst is used in such an amount as to catalyze the reaction of a diglycidyl ether of the bisphenol with the bisphenol to a sufficient degree, and is used in an amount of from 0.03 to 2 parts and, particularly, from 0.04 to 1 part per 100 parts of the mixture of the starting materials of the epoxy resin.

[Resol Phenolic Resin]

The resol phenolic resin used in the present invention is obtained by reacting phenols with a formaldehyde or a functional derivative thereof in the presence of a basic catalyst followed, as required, by the etherification with an alcohol.

Preferred examples of the phenols are as described below, which may be used in any combination.

Lower alkyl-substituted bifunctional phenols such as o-cresol, p-cresol, p-tert-butylphenol, p-ethylphenol, 2,3-xylenol, 2,5-xylenol, etc.;

bifunctional phenols such as p-tert-amylphenol, p-nonylphenyl, p-phenylphenol, p-cyclohexylphenol, etc.;

trifunctional phenols such as phenol (carbolic acid), m-cresol, m-ethylphenol, 3,5-xylenol, m-methoxyphenol, etc.;

monofunctional phenols such as 2,4-xylenol, 2,6-xylenol; and polycyclic polyhydric phenols such as 2,2'-bis(4-hydroxyphenyl)propane(bisphenol-A), 2,2'-bis(4-hydroxyphenyl)butane(bisphenol-B), bisphenol-F, 1,1'-bis(4-hydroxyphenyl)ethane, 4-hydroxyphenyl ether, p-(4-hydroxy)phenol, etc.

The most preferred phenols for constituting the resol phenolic resin used in the present invention are represented by the bisphenol-F. The bisphenol-F may be a highly refined product containing large amounts of binuclide or may be a coarsely refined product containing polynuclides. When particular attention is required concerning the elution, a phenol-novolak containing large amounts of polynuclides such as tetranuclide, etc. is often desirably used.

When it is particularly desired to cure the coating at a low temperature within a short period of time, a bisphenol-F containing much ortho-ortho and ortho-para methylene bonds is desired. Preferably, there is used the bisphenol-F having more than 60% and, more preferably, more than 68% of ortho-ortho and ortho-para methylene bonds among the whole methylene bonds. This is because, when the ratio of the ortho-bond is high, the p-position that exhibits higher reactivity to the formaldehyde than the opposition is vacant, and the methylol group coordinated at the p-position exhibits high reactivity.

In order to improve the property for being cured at a low temperature within a short period of time, it is desired to use the bisphenol-F containing ortho-ortho methylene bond in large amounts. Desirably, there is used the bisphenol-F having more than 10% and, more preferably, more than 17%, and most preferably, more than 23% of ortho-ortho methylene bond among the whole methylene bonds. The ortho-ortho methylene bond exhibits a high reactivity because a hydrogen of a phenolic OH group forms a strong intermolecular hydrogen bond which dissociates the other hydrogen to exhibit a very high acidity, enabling the phenolic resin itself which is a curing agent to exhibit self-catalyzed curing effect.

It is considered that a structure resembling the resol phenolic resin obtained by the reaction of the bisphenol-F with the formaldehyde, can be directly derived from the phenol and the formaldehyde in the presence of an alkali catalyst. However, the resol phenolic resin that is obtained contains large amounts of methylol compounds of monocyclic phenols of low molecular weights, giving inferior results concerning the elution when it is used as a paint for producing cans.

The formaldehyde is usually used in the form of an aqueous solution like formalin. It is, however, also allowable to use functional derivatives such as paraformaldehyde, polyoxymethylene and trioxane.

The methylolation reaction is usually carried out by using a formaldehyde in an amount of 1 to 10 mols and, particularly, 3 to 7 mols per mol of the phenols.

As the basic catalyst, use is made of a hydroxide of an alkali metal such as sodium hydroxide or potassium hydroxide, an alkali carbonate such as sodium carbonate or potassium carbonate, a hydroxide of an alkaline earth metal such as calcium hydroxide or magnesium hydroxide, or ammonia. It is desired that the basic catalyst is used in an amount of 0.2 to 3 mols and, particularly, 0.5 to 2 mols per mol of phenols.

The methylolation reaction is desirably carried out in an aqueous medium. Though there is no particular limitation on the reaction conditions, it is desired that the reaction is usually carried out at room temperature to 100° C. and, particularly, 40° to 80° C. for 0.5 to 10 hours and, particularly, 1 to about 5 hours. The concentration of phenols in the reaction system is preferably from 10 to 50%.

To isolate the resol phenolic resin from the final reaction product, the reaction mixture is neutralized with an acid such as hydrochloric acid, sulfuric acid, phosphoric acid, p-toluenesulfonic acid, oxalic acid, or acetic acid, the reaction product is precipitated and is, as required, filtered, washed with water and dried to recover in a solid form. According to another method, the reaction mixture after neutralized is extracted with ketones such as methyl ethyl ketone, cyclohexanone, or alcohols such as butanol, or a mixture solvent thereof with toluene or xylene thereby to recover the object product.

The methylol group of the resol phenol resin is alkyl-etherified by subjecting the methylol group in the resin and alcohol to the condensation reaction in the presence of an etherification catalyst and, particularly, an acid catalyst.

As the alcohols, there can be used methanol, ethanol, n- or iso-propanol, or n-, iso-, or tert-butanol. Preferably, there is used an alcohol with 3 to 6 carbon atoms and, particularly, butanol.

As the etherification catalyst, there can be used phosphoric acid, sulfuric acid, hydrochloric acid, aromatic sulfonic acid (e.g., p-toluenesulfonic acid), oxalic acid, acetic acid or the like acid. In synthesizing the resin, the methylol group-containing thermosetting resin that is dissolved and an alcohol are reacted together in a suitable solvent in the presence of the above-mentioned catalyst. It is desired that the catalyst is used in such an amount that the pH of the reaction system becomes from 4 to 6 and the reaction temperature is from 70 to 90° C. As the solvent, there can be used an excess of alcohol, toluene or xylene in one kind or in a combination. It is advantageous to carry out the reaction while removing water by-produced during the reaction. For this purpose, it is desired to carry out the reaction while taking the water in the reaction system out of the system in the form of azeotropic distillation together with the solvent.

When the amount of alcohol is insufficient in the system, the alcohol may be added to the reaction system, as a matter of course.

The preparation of a phenolic resin and the alkyl-etherification may be carried out through the same step or through separate steps. For instance, the reaction of phenols with a formaldehyde is carried out in a medium containing alcohol in the presence of an alkali catalyst and after a desired methylolated resin is obtained, an acid catalyst is added to the system to effect the alkyl-etherification reaction maintaining the above-mentioned pH value. Or, the methylolated resin that is formed may be separated by a known means and may be alkyl-etherified in a separate system.

The obtained alkyl-etherified resin may be neutralized, washed with water and dried to obtain a resin component for forming a coating, or a salt formed by the neutralization may be removed therefrom by any means so that it is used in the form of a resin solution.

[Epoxy Acrylate and Aqueous Paint]

The method of preparing an aqueous paint of an epoxy resin can be represented by an "esterification method" passing through an epoxy acrylate obtained by bonding an epoxy group in an epoxy resin with a carboxyl group in an acrylic resin through an ester bond as disclosed in Japanese Patent Publication No. 44578/1987 or 41949/1988, a "direct polymerization method" passing through an epoxy acrylate obtained by copolymerizing an epoxy resin having an acroyl group with an acrylic monomer as disclosed in Japanese Patent Publication No. 37287/1984 or 7213/1987, a "graft polymerization method" passing through an epoxy acrylate obtained by graft-polymerizing an acrylic monomer onto the skeletal carbon in the epoxy resin as disclosed in Japanese Patent Publication No. 38363/1987 or 17869/1988, or a "phase conversion method" of preparing an aqueous paint by mixing an epoxy resin and an acrylic resin without reacting them as disclosed in Japanese Laid-Open Patent Publication No. 275675/1988.

According to any method, basically, there is prepared a solvent solution of an epoxy acrylate (including a mixture) constituted by an epoxy resin and a polymer of an ethylenically unsaturated monomer containing an acrylic resin or carboxylic acid as an essential component, the carboxylic acid in the epoxy acrylate is neutralized with ammonia or amines, and water is dispersed while the neutralization is being effected.

Any one of the above-mentioned methods may be employed for preparing the aqueous paint using a copolymerized epoxy resin of the present invention. A particularly desired aqueous paint is produced by graft-polymerizing an ethylenically unsaturated monomer comprising a (meth) acrylic acid as an essential component onto the copolymerized epoxy resin. In the graft polymerization method, the epoxy acrylate assumes a comb structure or a star structure being grafted with an acrylic resin having a molecular weight smaller than that of the epoxy resin, giving such an advantage that the solvent may be used in small amounts since the viscosity is low. In the graft polymerization method, furthermore, the hydrogen pull reaction due to a free radical catalyst tends to occur on the epoxy resin with an increase in the molecular weight of the epoxy resin, whereby the acrylic grafting efficiency increases, which is best suited for producing an aqueous paint of a high molecular epoxy resin of the present invention. Besides, since the modification of the epoxy resin with a (meth)acrylic monomer is executed simultaneously with the polymerization of an acrylic resin, the number of steps for producing the aqueous paint can be decreased compared with other methods.

As the ethylenically unsaturated monomer, there is used a copolymerizable monomer mixture of (meth)acrylic acid ester, styrene and vinyl toluene containing a (meth)acrylic acid as an essential component. In particular, a composition constituted by 60 to 70% of (meth)acrylic acid, 30 to 40% of styrene and less than 1% of ethyl acrylate, exhibits-excellent properties from the standpoint of elution of the coating and maintaining flavor.

In the aqueous paint of the present invention, the epoxy acrylate contains an epoxy resin and an acrylic resin at a weight ratio of from 90:10 to 75:25. When the content of the acrylic resin is smaller than the above-mentioned range, it becomes difficult to prepare an aqueous paint of the epoxy resin. When the content of the acrylic resin is larger than the above-mentioned range, the coating loses resistance against the water and further loses properties in regard to elution and flavor.

The reaction of the epoxy resin and the ethylenically unsaturated monomer is carried out in the presence of a free radical catalyst and, preferably, in the presence of a free radical catalyst of the peroxide type. Examples of the preferred free radical catalyst include cumene hydroperoxide, benzoyl peroxide, t-butylperbenzoate, t-butylperoxide, lauroyl peroxide, methyl ethyl ketone peroxide, and the like. Among them, a particularly preferred free radical catalyst is a benzoyl peroxide.

The benzoyl peroxide which is a free radical catalyst is used in an amount of preferably 2 to 7% and, most preferably, 2.5 to 5% with respect to the ethylenically unsaturated monomer. In the graft polymerization, in general, the free radical catalyst had to be used in an amount of at least 3% and, most desirably, in an amount of from 6 to 7% with respect to the ethylenically unsaturated monomer for producing the aqueous paint. According to the present invention, on the other hand, the aqueous paint can be produced even by using a free radical catalyst in an amount of less than 3%, making it possible to greatly decrease the amount of the free radical catalyst. The reason is attributed to that the copolymerized epoxy resin has a very large molecular weight permitting the hydrogen pull reaction to easily occur, and that since the copolymerized epoxy resin partly contains the bisphenol-F containing ortho-ortho and ortho-para methylene bonds in large amounts, a very reactive p-position carbon is added in addition to the aliphatic skeletal carbon that has heretofore been known as a hydrogen pull point, exhibiting a very enhanced grafting efficiency. In the conventional graft polymerization method, free radical residues are much formed and acrylic resin components are much formed having low molecular weights and without being grafted to the epoxy resin, imposing a serious problem from the standpoint of elution of the coating. The aqueous paint of the present invention, however, improves these points and makes it possible to obtain a coating having very excellent elution property.

The carboxylic acid component in the epoxy acrylate can be neutralized and self-emulsified by using an ammonia or amines, such as aliphatic, alicyclic or aromatic primary, secondary or tertiary amine. In particular, there can be used a branched chain alkylamine having 3 to 6 and, particularly, 3 to 4 carbon atoms, such as isopropylamine, sec-butylamine, tert-butylamine or isoamylamine, and a hetero-cyclic amine like a saturated heterocyclic amine having a nitrogen atom, such as pyrrolidine, piperidine or morpholine. There can be further used a mono-, di- or tri-ethanolamine. A particularly preferred amine is a dimethyl-ethanolamine. The neutralizing agent is used in an amount which is sufficient for neutralizing 30 to 100 mol %, more preferably, 40 to 70 mol % and, most preferably, 40 to 60 mol % of the carboxylic acid.

In general, the self-emulsifying epoxy acrylate is dispersed in the water by introducing the water into the epoxy acrylate with stirring or by introducing the epoxy acrylate into the water. From the practical point of view, the latter method is desirable since the undispersed epoxy acrylate adheres little to the reactor.

Described below is a particularly preferred procedure for producing the aqueous paint of the present invention.

A copolymerized epoxy resin suited for the present invention is batchwisely polymerized and is then diluted with a solvent so that the solid component is 50 to 80% and, particularly, 60 to 70%, and the temperature is maintained at 100° to 140° C. and, particularly, at 110° to 130° C. Then, an ethylenically unsaturated monomer composition containing a benzoyl peroxide is gradually added thereto with stirring in the absence of oxygen over a period of from 30 to 60 minutes. Even after the addition has been finished, the mixture is maintained for 15 to 30 minutes to continue the polymerization of the epoxy acrylate. Then, a resol phenolic resin is added in an amount of from 0.5 to 7 parts per 100 parts of the epoxy acrylate, followed by the addition of a dimethylethanolamine to partly neutralize the carboxylic acid in the epoxy acrylate. Then, the epoxy acrylate is thrown into the water with high-speed stirring to prepare a water dispersion.

Thereafter, as required, a wax, a viscosity-adjusting agent, a leveling agent, a wettibility improving agent, blistering improving agent and other additives. Furthermore, the viscosity and solid content may be adjusted by adding amine water or by the hydrogenation, and the solvent may be removed to decrease the amount of the solvent or to replace the solvent. The order of adding the resol phenolic resin and the lubricating agent is in no way limited thereto only but may be added before or after the dispersion.

[Use]

The paint of the present invention is useful as a paint for a variety of base materials and is particularly useful as a paint for producing cans. The paint can be applied to the can blank in any stage.

The paint can be adapted to the coil coating of can closures, and is applied to pure aluminum or to an aluminum alloy, etc. to obtain a coated metal blank having high degree of workability. The coated can blank is punched, press-molded, or is further subjected to the score working, button working, or a tab is attached thereto, to mold a can closure or an easy-open can closure. It is, of course, allowable to reverse the order; i.e., the paint is applied to the can barrel and to the can closure after the can is produced or is applied to the can followed by baking. The paint may be applied as a single coating or as double coatings.

The paint can be applied to the can barrel, as a matter of course. In the case of a three-piece can having a side seam, the paint is applied to a black plate, to a variety of coated steel plates such as a steel plate plated with tin, chrome, aluminum or zinc, or to a steel plate of which the surfaces are chemically treated with chromic acid and/or phosphoric acid or are treated with cathodic electrolysis; applied to a light metal plate such as of aluminum; or is applied to a can blank such as a composite metal blank obtained by laminating an aluminum foil or the like on the surfaces of an organic substrate such as polyolefin resin film or paper board, followed by baking, soldering, welding or junction using an adhesive, thereby to obtain a can barrel. In the case of a two-piece can, the coated metal plate is subjected to the deep-draw-forming or to the thickness-reducing deep-draw-forming, in order to obtain a coated can.

In the case of a seamless can barrel, the can blank may be subjected to the draw working or to the draw-ironing working, and the paint is applied to the can barrel that is molded and is baked.

The paint of the present invention can be applied to the can blank, can barrel, can closure or can by any means such as dip coating, roller coating, spray coating, brush coating, electrostatic coating, electrodeposition coating, wire coating, flow coating or doctor coating. The paint is applied maintaining a thickness of, generally, 1 to 15 microns and, particularly, 3 to 10 microns on the basis of a dry coating.

The paint is baked under the conditions of a low temperature for a short period of time. Though it may vary depending upon the amount of blending the epoxy acrylate and the resol phenolic resin in the paint, conditions are selected generally from the temperature range of 200° to 260° C. and the baking time of from 10 to 50 seconds so as to accomplish a sufficient degree of curing from the standpoint of resistance against chemicals and resistance against the heat and water.

EXAMPLES

The invention will now be described in detail by way of Examples in which percent and parts are all by weight.

[Measurement of Molecular Weight]

By using the tetrahydrofuran (THF) as a developer solvent, the molecular weight of the epoxy resin was measured by the GPC method (gel permeation chromatography). A calibration curve was formed by using polystyrene standard samples (F-128, F-40, F-10, F-4, F-2, F-1, A-2500, A-500) produced by Toso Co., and the molecular weights of not smaller than 200 of the epoxy resin were calculated to find a number average molecular weight (Mn), weight average molecular weight (Mw) and a molecular weight distribution (Mw/Mn). A sample solution was prepared at a rate of dissolving 4 mg of epoxy resin in 1 ml of THF, and the measurement was taken by pouring a sample in an amount of 100 μl, flowing the solvent at a rate of 1 ml/min. and at 40° C. The GPC and column were HLC-8020 and TSK-GEL(G1000HXL, G2000HXL, G3000HXL, G4000HXL) manufactured by Toso Co., and the analyzing time was 50 minutes. When the sample to be measured contained solvents other than THF in large amounts, the sample solution was prepared after most of the solvent was removed by drying.

From the area ratio of the GPC chart, furthermore, percentage (%) of low molecular components having Mn of not larger than 1000 in the epoxy resin was determined.

[Epoxy Equivalent:EEW]

The epoxy resin of 3 to 4 g was accurately weighed to a unit of 0.1 mg into a 100-ml Erlenmayer flask and was dissolved by adding thereto 20 ml of methylene chloride. Then, 10 ml of a tetraethylammonium bromide (TEAB) reagent (1 g of TEAB/4 ml of glacial acetic acid solution) and two to three droplets of a crystal violet (CV) indicator (1 g of CV/1 ml of glacial acetic acid solution) were added thereto, and the mixture was titrated with a 0.1N perchloric acid-acetic acid solution. The blank testing was conducted by the same method, and the epoxy equivalent was found from the following formula, $$EEW\ (g/eq) = \frac{1000 \cdot W}{(V-B) \cdot N \cdot F}$$

W: weight of the sample (g).

V: amount (ml) of titration of 0.1N perchloric acid-acetic acid solution.

B: amount of titration (ml) of 0.1N perchloric acid-acetic acid solution in the blank testing.

N: normality (eq/l) of 0.1N perchloric acid-acetic acid solution.

F: factor of 0.1N perchloric acid-acetic acid solution.

[Measurement of Viscosity]

The viscosity of the paint was measured at 25° C. by using the Brookfield (type B) viscometer by rotating a #2 rotor at 60 rpm.

The paint for cans of the present invention was developed in order that the paint can be applied to the metal plate by natural or reverse roll coating, and a proper viscosity for applying the paint ranges from 100 to 600 cps. When the viscosity is larger than this proper range, the paint is poorly transferred onto the plate material, the leveling becomes poor, and it becomes difficult to adjust the amount of coating. When the viscosity is lower than the above range, the paint drips, becomes loose, and scatters from the rolled end. Besides, it becomes difficult to maintain the coating thickness.

[Evaluation of Coating Properties]

The coating properties were evaluated in regard to four items, i.e., "retort elution: consumption of potassium permanganate", "retort whitening", "feathering" and "resistance against working and corrosion". Details of the testings are shown in Example 1.

"Retort elution" is the evaluation of the total amount of organic materials that may elute out into the beverage from the coating and has a very important meaning from the standpoint of maintaining sanitation and flavor (preserving flavor). It is desired that the consumption of potassium permanganate is smaller than 10 ppm.

"Retort whitening" represents the state of the coating after retorting. The coating that is whitened through the retorting generally means a lack of curing, and the coating lacks resistance against the heat and water. In the case of a paint using a high molecular epoxy resin, the workability is improved when the coating is cured slightly insufficiently and the coating exhibits good continuity after the closure is formed. In the case of such a closure, however, the coating lacks corrosion resistance and corrosion develops relatively at an early time though it may vary depending upon the corrosion-inducing tendency of the content.

"Feathering" is the evaluation of adhesiveness between the coating and the underlying metal. In recent years, the can closures are shifting from the pull-tab type to the stay-on tab type. Therefore, the development of feathering which is a fatal defect of the pull-tab type is losing its practical meaning. However, the coating which is poorly adhered generally exhibits poor corrosion resistance and, hence, this is still an important testing for expecting the corrosion resistance for extended periods of time.

"Resistance against working and corrosion" is a promoted aging testing for evaluating the corrosion resistance by practically forming a closure and by using a model corrosive solution. A mixture solution of table salt and citric acid was used as a model corrosive solution to evaluate the corrosion resistance against acidic beverages and beverages containing salts.

[Bisphenol-F]

Four kinds of bisphenols-F, F-1 to F-4, shown in Table 1 were synthesized from a phenol and a 37% formalin according to a customary method. By setting the molar ratio of the phenol to the formaldehyde to be 4:1, the reaction time to be 2.5 hours and the reaction temperature to be 100° C., various bisphenols-F were synthesized by changing the catalyst and pH, and the purity of binuclides, and the contents of three kinds of isomers were determined by measuring EPLC. F-3 and F-4 are those when the degree of refining the bisphenol-F is changed.

[Liquid Epoxy Resin]

A bisphenol and an epichlorohydrin were fed at a molar ratio of 1:10 into a reactor equipped with a stirrer, a thermometer, a dropping funnel and a device for condensing and separating an azeotropic mixture of epichlorohydrin and water to return the epichlorohydrin to the reactor. The epichlorohydrin and water were heated and refluxed with stirring. The sodium hydroxide was dropwisely added thereto in an amount of 2.5 times of moles as much as the bisphenol and in the form of a 40% aqueous solution, the addition being effected over a period of 3 hours to effect the reaction. After the dropwise addition of the sodium hydroxide is finished, the mixture was heated for 15 minutes to completely remove the water. Thereafter, the unreacted epichlorohydrin was recovered by distillation. In order to remove table salt and sodium hydroxide, furthermore, the formed product was repetitively washed in hot water and was, then, heated at about 120° C. to completely remove the water by drying. Properties of the thus obtained liquid epoxy resin were as shown in Table 2.

[Copolymerized Epoxy Resin]

A copolymerized epoxy resin was polymerized by a customary method from a variety of bisphenols-F shown in Table 1 or from a mixture of a bisphenol-F and a bisphenol-A, or from the bisphenol-A and a liquid epoxy resin (LER-1 or LER-2) shown in Table 2. The LER and the bisphenol were used at a molar ratio of from 1.00:1.00 to 1.08:1.00. By using an ethyltriphenylphosphonium acetate-acetic acid complex catalyst and a diethylene glycol-n-butyl ether in amounts of 0.1 part and 10 parts, respectively, per 100 parts of the starting resins (LER+bisphenol), the mixture was heated at 175° C. over a time of 1.5 hours, maintained at 175° C. for 1 to 3.5 hours, so that the resin grew to acquire a desired molecular weight and, then, 50 parts of a mixture solvent (n-butanol 60%+butyl cellosolve 40%) was added thereto to terminate the reaction, thereby to prepare a resin solution having 62.5% of a solid component (CE-12, however, was poorly compatible with n-butanol and, hence, 50 parts of butyl cellosolve was added to prepare a resin solution having 62.5% of a solid component). The molecular weights and epoxy equivalents of the obtained copolymerized epoxy resins were found by the GPC method and titration to be as shown in Table 3. In Table 3, the bis A/F ratio is a molar ratio of the bisphenol-A component to the bisphenol-F component in the copolymerized epoxy resin.

[Resol Phenolic Resin]

Various resol phenolic resins were synthesized from the phenols and the formaldehyde using a sodium hydroxide catalyst. The formaldehyde was used in the form of a 37% formaline and the sodium hydroxide was used in the form of a 40% aqueous solution. To the reaction product was added n-butanol in an amount 10 times as much mols as the phenols. Furthermore, the sodium hydroxide was neutralized with an excess amount of a 20% hydrochloric acid aqueous solution. The mixture was stirred for several minutes and was then left to stand still. The isolated water layer was removed to obtain an organic layer containing a resol phenolic resin. The obtained organic layer was washed and neutralized by using water and ammonia water. Thereafter, the water was removed by distillation to effect the condensation, thereby to obtain a resol phenolic resin solution containing 50% of solid component. The conditions for synthesizing the resol phenolic resin and the molecular weights were as shown in Table 4. The molecular weight of the resol phenolic resin was measured in compliance with a method described in the "Measurement of Molecular Weight". A calibration curve was formed by adding a styrene monomer to a polystyrene standard sample for calibration curve, and the molecular weights of larger than 100 were measured to calculate Mn and Mw.

[EXAMPLE 1]

136 Parts of a solution containing 62.5% of a copolymerized epoxy resin CE-2 was heated at 120° C. in a nitrogen stream with stirring in a reactor equipped with a stirrer having a tachometer and a torque meter, thermometer, port for introducing nitrogen, tank for dropping monomer, heating unit, cooling unit and a device which removes solvent and returns the separated water phase back to the reactor. Then, 15 parts of a monomer mixture containing 65% of methacrylic acid, 34% of styrene and 1% of ethyl acrylate, and a mixture solution of 0.7 parts of 75% benzoyl peroxide and 5 parts of butyl carbitol, were dropwisely added thereto over a period of 45 minutes. After the dropwise addition has been finished, the reaction was continued for 15 minutes. Then, 4 parts of a solution of resol phenolic resin containing 50% of a bisphenol-F RP-1 was added thereto and was homogeneously dissolved therein, followed by the addition of 5 parts of dimethylethanolamine. After the amine has been added, heating was discontinued and the temperature was lowered down to 110° C. over a period of 5 minutes. Then, 100 parts of distilled water was added thereto with vigorous stirring at 300 rpm. After the temperature was cooled down to lower than 60° C., another 75 parts of distilled water was added thereto. 17 Parts of n-butanol (which contained small amounts of water and other solvents) was removed from the obtained water dispersion, the solid component and viscosity were adjusted with water containing 30% of dimethylethanolamine and with distilled water, thereby to prepare an aqueous paint containing 30% of a solid component and having a viscosity of 455 cps. The obtained aqueous paint was spread on an aluminum plate using a #14 bar coater to observe the dispersion of the paint. It was confirmed that fine uniform particles had been dispersed. The aqueous paint having poor dispersion contains coarse lumpy masses (lumps). The aqueous paint was preserved for one month at room temperature and was observed. No particle precipitated and the dispersion stability was good.

An aluminum 5182 member having a thickness of 0.28 mm without being coated on the outer surface thereof and the same aluminum member having a 5-μm thick coating on the outer surface thereof, were roll-coated on the inner surfaces thereof with the aqueous paint such that the amount of the coating after drying was 110 mg/dm$^2$, and were passed through a hot-air oven of the belt conveyer type to bake the coatings. The baking conditions consisted of a period of passing through the hot-air zone in the oven (hereinafter referred to as pass time) of 20 seconds, and an attainable maximum temperature (PMT: peak metal temperature) that was measured of 240° C. describing a mountain-shaped temperature curve.

The retort elution of the coating was evaluated by using a material having no coating on the outer surface thereof. By using 1 ml of distilled water per 1 cm$^2$ of the coating, retort extraction was effected at 125° C. for 30 minutes, and the extract and the blank testing solution were tested for their amount of consuming potassium permanganate in compliance with "A Method of Testing General Utensils or Containers, Notification No. 2 of the Ministry of Health and Welfare. The amount of consumption of potassium permanganate was calculated according to the following formula, Amount of consumption of potassium permanganage (ppm) =

$$\frac{(a-b) \times 1000}{100} \times 0.316$$

a: amount (ml) of titration of a 0.01N potassium permanganate solution in the main testing, b: amount (ml) of titration of a 0.01N potassium permanganate solution in the blank testing.

It was learned that the amount of consumption of potassium permanganate was 5.7 ppm, and excellently small retort elution was exhibited despite of the baking at a low temperature for a short period of time.

Next, a pull-tab type can closure having a nominal diameter of 206 was formed by using the material which has been coated on its inner and outer surfaces. The formed can closure was retort-treated (125° C. for 30 minutes) in the city water and was then opened to evaluate the presence of feathering at the opening portion. No feathering occurred in 10 can closures. When the coating poorly adheres to the aluminum underlayer, the coating that is peeled remains at the score portion in the opening on the tab side giving rise to the occurrence of a feathering phenomenon in which rugged coating protrudes from the end of the opening.

The whitening of the coating after retorting was evaluated simultaneously with the feathering testing, but no whitening occurred in 10 cans.

Next, a stay-on-tab type can closure having a nominal diameter of 206 was formed by using the material which has been coated on its inner and outer surfaces. The curled portion of the can closure was lined with an aqueous compound of the SBR-type and was dried at 100° C. for 10 minutes. A 350-ml seamless can having a nominal barrel diameter of 211 and a diameter at the neck-in portion of 206 was filled with 50 ml of an aqueous solution containing 5% of table salt and 5% of citric acid. Then, the can closure that was obtained was double-wrap-seamed to prepare a sampling can for evaluating corrosion resistance. The sampling cans for evaluating the corrosion resistance were preserved upside down at 50° C. for one month to evaluate the corrosion on the inner surface of the can closure. None has developed corrosion among 10 cans.

[EXAMPLE 2]

An aqueous paint containing 30% of a solid component and having a viscosity of 420 cps was prepared quite in the same manner as in Example 1 but using, as a copolymerized epoxy resin, a solution containing 62.5% of copolymerized epoxy resin CE-3.

No abnormal condition was found in the dispersion testing using a #14 bar coater and in the dispersion stability testing based upon the preservation at room temperature for one month, and good results were obtained.

Furthermore, a coated plate was prepared in the same manner as in Example 1 and a variety of coating properties were tested. In the retort elution testing, potassium permanganate was consumed in an amount of 3.8 ppm, and good results were exhibited in the retort whitening, feathering and corrosion testings. It was learned that the aqueous paint of Example 2 exhibited coating properties suited for the can closures and could be baked at a low temperature within a short period of time.

[COMPARATIVE EXAMPLE 1]

An aqueous paint containing 30% of a solid component was prepared quite in the same manner as in Example 1 but using, as a copolymerized epoxy resin, a solution containing 62.5% of a copolymerized epoxy resin CE-1. The aqueous paint exhibited a high viscosity (large torque) throughout the whole preparation steps, stirring was effected with difficulty, and the obtained water dispersion exhibited a relatively low viscosity but the fluidity exhibited dilatancy.

In the dispersion testing using the #14 bar coater, lumpy matters were observed on the whole coated surface from which it was confirmed that the dispersion was poor. Even in the dispersion stability testing, the phase separated in one day, and the lower dispersion layer lost fluidity after one week.

The aqueous paint exhibited dilatancy and could not be roll-coated. Therefore, the aqueous paint was applied onto one surface of a 0.28 mm thick aluminum 5182 material having no coating on the outer surface thereof using a bar coater such that the thickness of the coating after drying was 110 mg/dm$^2$ and was baked under the conditions of a PMT of 240° C. for a pass time of 20 seconds.

The obtained coated plate was evaluated for its retort elution and retort whitening. Potassium permanganate was consumed in an amount of 14.8 ppm and a strong retort whitening tendency was exhibited.

Since the coating property was poor, the feathering testing and the corrosion testing were not conducted.

[COMPARATIVE EXAMPLE 2]

An aqueous paint containing 30% of a solid component and having a viscosity of 461 cps was prepared quite in the same manner as in Example 1 but using, as a copolymerized epoxy resin, a solution containing 62.5% of a copolymerized epoxy resin CE-4.

In the dispersion testing using the #14 bar coater, fine particle dispersion was formed but lumpy matters were also observed. Even in the dispersion stability testing, some precipitate was observed after one month.

The aqueous paint was applied by roll coating onto the inner surfaces of a 0.28 mm thick aluminum 5182 material having no coating on the outer surface thereof and of the same aluminum material but having a 5 μm coating on the outer surface thereof such that the amount of the coating after drying was 110 mg/dm$^2$ and was baked under the conditions of a PMT of 240° C. for a pass time of 20 seconds.

The coating performance was evaluated like in Example 1. In the retort elution testing, potassium permanganate was consumed in an amount of 15.5 ppm, and a very slight degree of retort whitening was observed. The feathering testing exhibited good results. In the corrosion testing, however, two cans corroded among 10 cans.

Examples 1 and 2, and Comparative Examples 1 and 2 are those cases in which the molar ratio for copolymerizing the bisphenol-A and bisphenol-F is changed in the copolymerized epoxy resin. The results were as shown in Table 5.

[EXAMPLE 3]

128 Parts of a solution containing 62.5% of a copolymerized epoxy resin CE-6 was heated at 123° C. in a nitrogen stream with stirring in the same manner as in Example 1. Then, 20 parts of a monomer mixture containing 69% of methacrylic acid, 30% of styrene and 1% of ethyl acrylate, and a premixed solution of 1.3 parts of 75% benzoyl peroxide and 10 parts of butyl carbitol, were dropwisely added thereto over a period of 60 minutes. The mixture was further maintained for 15 minutes to polymerize the epoxy acrylate. Then, 8 parts of a solution containing 50% of a resol phenolic resin of a bisphenol-F RP-2 was added thereto and was homogeneously dissolved therein, followed by the addition of 7 parts of dimethylethanolamine. After the amine has been added, heating was discontinued and the mixture was left to cool with stirring for 3 minutes. Then, 100 parts of distilled water was added thereto with vigorous stirring at 300 rpm. After the temperature was cooled down to lower than 60° C., another 73 parts of distilled water was added thereto. 17 Parts of n-butanol (which contained small amounts of water and other solvents) was removed from the obtained water dispersion, the solid component and viscosity were adjusted with water containing 30% of dimethylethanolamine and with distilled water, thereby to prepare an aqueous paint containing 28% of a solid component and having a viscosity of 388 cps.

Dispersion property and dispersion stability were tested in the same manner as in Example 1, and good results were obtained.

A coated plate was prepared in the same manner as in Example 1 to test the coating properties. In the retort elution testing, potassium permanganate was consumed in an amount of 6.2 ppm. Good results were obtained even in the retort whitening testing, feathering testing and corrosion resistance testing.

[EXAMPLES 4, 5 AND COMPARATIVE EXAMPLES 3, 4]

Aqueous paints of Examples 4, 5 and Comparative Examples 3, 4 were prepared by adjusting the concentration of solid component to be 28% and the viscosity to be 350 to 480 cps in the same manner as in Example 3 but using, as a copolymerized epoxy resin, the solutions containing 62.5% of copolymerized epoxy resins CE-7, CE-8, CE-5 and CE-9. The copolymerized epoxy resin CE-7 was used for Example 4, the copolymerized epoxy resin CE-8 was used for Example 5, the copolymerized epoxy resin CE-5 was used for Comparative Example 3, and the copolymerized epoxy resin CE-9 was used for Comparative Example 4.

In the dispersion testing and dispersion stability testing of the obtained aqueous paints, Examples 4 and 5 and Comparative Example 4 showed good results. In the dispersion testing, however, the aqueous paint of Comparative Example 3 exhibited lumpy substance on the coated surface to a considerable degree. Even in the dispersion stability testing, a considerable degree of precipitate was observed after one month. The aqueous paint of Comparative Example 3 exhibited a high viscosity (large torque) throughout the whole preparation steps making the stirring difficult. As will be understood from the poor dispersion, the copolymerized epoxy resin CE-5 of Comparative Example 5 has such a high molecular weight that its number average molecular weight exceeds 15000 and in which the molecules are entangled by each other in a complex manner. That is, the molecular weight is too large and it is difficult to untie the entanglement among the molecules to form a dispersion or to obtain a self-emulsifying property.

The aqueous paints were applied by roll coating onto the inner surfaces of a 0.28 mm thick aluminum 5128 material having no coating on the outer surface thereof and of the same aluminum material having a 5 μm thick coating on the outer surface thereof, such that the thickness after drying was 110 mg/dm², and were baked under the conditions of a PMT of 240° C. and a pass time of 20 seconds. The aqueous paints of Examples 4, 5 and Comparative Example 4 made it possible to obtain coated plates having favorable coating properties. When the aqueous paint of Comparative Example 3 was used, however, the coated plate exhibited poor smoothness permitting lumpy material to stay on the coated surface.

The coating properties were tested in the same manner as in Example 1.

In Examples 4 and 5, retort elutions were 6.9 ppm and 7.8 ppm, and good results were obtained in the retort whitening testing, feathering testing and corrosion resistance testing.

In Comparative Example 3, potassium permanganate, was consumed in an amount of 5.3 ppm in the retort elution testing. Good results were also obtained even in the retort whitening testing and feathering testing. In the corrosion resistance testing, however, all 10 cans were corroded.

In Comparative Example 4, the retort elution was as great as 23.5 ppm and a strong retort whitening tendency was exhibited, too. Though the feathering testing exhibited good results, 8 cans were corroded among 10 cans in the corrosion resistance testing.

Examples 3 to 5 and Comparative Examples 3, 4 are those cases in which the number average molecular weight of the copolymerized epoxy resin is changed, and the results were as shown in Table 5.

[COMPARATIVE EXAMPLE 5]

An aqueous paint containing 30% of a solid component was prepared quite in the same manner as in Example 1 but using, as a copolymerized epoxy resin, a solution containing 62.5% of a copolymerized epoxy resin CE-10. The aqueous paint exhibited a high viscosity (large torque) throughout the whole preparation steps, stirring was effected with difficulty, and the obtained water dispersion exhibited a relatively low viscosity but the fluidity exhibited dilatancy.

In the dispersion testing using the #14 bar coater, lumpy matters were observed on the whole coated surface from which it was confirmed that the dispersion was poor. Even in the dispersion stability testing, the phase separated in one day, and the lower dispersion layer lost fluidity after one week.

The aqueous paint exhibited dilatancy and could not be roll-coated. Therefore, the aqueous paint was applied onto one surface of a 0.28 mm thick aluminum 5182 material having no coating on the outer surface thereof using a bar coater such that the thickness of the coating after drying was 110 mg/dm² and was baked under the conditions of a PMT of 240° C. for a pass time of 20 seconds.

The obtained coated plate was evaluated for its retort elution and retort whitening. Potassium permanganate was consumed in an amount of 13.6 ppm and a retort whitening tendency was exhibited.

Since the coating property was poor, the feathering testing and the corrosion resistance testing were not conducted.

The aqueous paint of Comparative Example 5 behaved quite similarly to the aqueous paint of Comparative Example 1 in regard to preparation of paint, easiness for coating, fluidity and coating properties. This is because the copolymerized epoxy resin in Comparative Example 5 used a bisphenol-F containing much para-para methylene bonds. Therefore, the epoxy resin solution and the epoxy acrylate exhibited increased viscosity giving the same results as those of when use was made of an epoxy resin containing a large amount of bisphenol-A of Comparative Example 1.

[COMPARATIVE EXAMPLE 6]

An aqueous paint containing 30% of a solid component and having a viscosity of 466 cps was prepared quite in the same manner as in Example 1 but using, as a copolymerized epoxy resin, a solution containing 62.5% of a copolymerized epoxy resin CE-11.

The dispersion and dispersion stability were tested in the same manner as in Example 1, and good results were obtained.

A coated plate was prepared in the same manner as in Example 1 to test the coating properties. In the retort elution testing, potassium permanganate was consumed in an amount of 13.2 ppm, and good results were obtained in the retort whitening and feathering testings. In the corrosion resistance testing, however, 2 cans were slightly corroded among 10 cans.

This is attributed to that since the copolymerized epoxy resin is derived from the liquid epoxy resin of a bisphenol-F and a bisphenol-A, the molecular weight distribution is broadened and the percentage of low molecular components is heightened.

[COMPARATIVE EXAMPLE 7]

85 Parts of a phenoxy resin (trade name: PKHH) (Mn: 12400, Mw: 65800, EEW: 26000 g/eq) produced by Phenoxy Associate Co., and 51 parts of a mixture solvent containing 50% of an n-butanol, 33% of a butyl cellosolve and 17% of a propylene glycol-n-butyl ether, were fed into the reactor that was used in Example 1, heated at 120° C. with stirring, and were dissolved over a period of 2.5 hours. An aqueous paint containing 30% of a solid component was prepared in the same manner as in Example 1 but using the solution of the above-mentioned epoxy resin instead of using the solution of the copolymerized epoxy resin. The aqueous paint exhibited a high viscosity (large torque) over the whole preparation steps, making the stirring and dispersion difficult. The obtained dispersion exhibited a strong dilatancy fluidity. Precipitate was confirmed immediately after the dispersion.

Poor dispersion property was exhibited even in the dispersion testing and in the dispersion stability testing.

The aqueous paint was applied onto one surface of a 0.28 mm thick aluminum 5182 material having no coating on the outer surface thereof using a bar coater such that the thickness of the coating after drying was 110 mg/dm$^2$ and was baked under the conditions of a PMT of 240° C. for a pass time of 20 seconds. The obtained coated plate was evaluated for its retort elution and retort whitening. Potassium permanganate was consumed in an amount of 18.4 ppm and a retort whitening tendency was exhibited.

The subsequent feathering testing and corrosion testing were not conducted.

The PKHH resin is a high molecular epoxy resin obtained from a bisphenol-A and an epichlorohydrin through a one-stage polymerization method (taffy method).

[COMPARATIVE EXAMPLE 8]

An aqueous paint containing 30% of a solid component and having a viscosity of 495 cps was prepared in the same manner as in Example 1 but using a solution containing 62.5% of a bisphenol-F epoxy resin CE-12 instead of using the copolymerized epoxy resin. However, the solvent was not removed.

The aqueous paint exhibited a low viscosity (small torque) over the while preparation steps, and the stirring and dispersion could be easily accomplished. The obtained aqueous paint exhibited good results in the dispersion testing and in the dispersion stability testing.

The aqueous paint was applied by roll coating onto the inner surfaces of a 0.28 mm thick aluminum 5182 material having no coating on the outer surface thereof and of the same aluminum material having a 5 μm thick coating on the outer surface thereof, so that the amount of coating after drying was 110 mg/dm$^2$, and was baked under the conditions of a PMT of 240° C. and a pass time of 20 seconds.

The coating properties were evaluated, and the retort elation was as bad as 15.2 ppm, and retort whitening tendency was exhibited to a slight degree. Good result was exhibited in the feathering testing. In the corrosion resistance testing, however, 3 cans were corroded among 10 cans.

[EXAMPLE 6]

An epoxy acrylate was polymerized in the same manner as in Example 1 by using 136 parts of a solution containing 62.5% of a copolymerized epoxy resin CE-3. 12 Parts of a solution containing 50% of a resol phenolic resin of bisphenol-F RP-3 was added thereto, and an aqueous paint containing 30% of a solid component and having a viscosity of 463 cps was prepared in the same manner as in Example 1.

The obtained aqueous paint exhibited good dispersion property and dispersion stability.

A coated plate was prepared in the same manner as in Example 1 to test the coating properties. In the retort elution testing, potassium permanganate was consumed in an amount of 9.1 ppm. Good results were obtained in the retort whitening testing, feathering testing and corrosion resistance testing.

[COMPARATIVE EXAMPLE 9]

An epoxy acrylate was polymerized in the same manner as in Example 1 by using 136 parts of a solution containing 62.5% of a copolymerized epoxy resin CE-3. 20 Parts of a solution containing 50% of a resol phenolic resin of bisphenol F RP-1 was added thereto, and an aqueous dispersion was prepared in the same manner as in Example 1. Then, 25 parts of n-butanol was removed from the water dispersion, and the solid component and the viscosity were adjusted with water containing 30% of dimethylethanolamine and with distilled water to prepare an aqueous paint containing 28% of a solid component and having a viscosity of 421 cps.

The obtained aqueous paint exhibited good dispersion property and dispersion stability.

The coated plate was prepared in the same manner as in Example 1 to evaluate the coating properties. The retort elution was 23.2 ppm, and good results were obtained in the retort whitening testing and in the feathering testing. In the corrosion resistance testing, however, 8 cans were corroded among 10 cans. This can be attributed to that the phenolic resin is added in too large amounts, the retort elution components due to the phenolic resin are increased correspondingly, and the coating that is cured to a high degree loses workability and flexibility to a striking degree.

[COMPARATIVE EXAMPLE 10]

An aqueous paint containing 30% of a solid component and having a viscosity of 435 cps was prepared in the same manner as in Example 1 by using 136 parts of a solution containing 62.5% of a copolymerized epoxy resin CE-3 but without adding resol phenolic resin.

The obtained aqueous paint exhibited good dispersion property and dispersion stability.

A coated plate was prepared in the same manner as in Example 1 to evaluate the coating properties. Retort elution was as very excellent as 2.7 ppm but a strong retort whitening tendency was exhibited. In the feathering testing, development of feathering was observed in all 10 cans. Even in the corrosion resistance testing, all 10 cans were corroded.

It will be understood from the results of comparison that the phenolic resin component is playing an important role for suppressing the retort whitening, improving the adhesion between the coating and the underlying metal, and improving the corrosion resistance.

[COMPARATIVE EXAMPLE 11]

By using the reactor used in Example 1, 152 parts of a solution containing 62.5% of a copolymerized epoxy resin CE-3 was heated at 120° C. in a nitrogen stream with stirring. Then, the monomer, and the premixed solvent of benzoyl peroxide and butyl carbitol used in Example 1 were dropwisely added thereto in an amount one-third that of Example 1 over a period of 30 minutes to polymerize the epoxy acrylate. The subsequent operation was carried out in the same manner as in Example 1 in an attempt to prepare an aqueous paint. In the water dispersion after neutralized with amine, however, the water and epoxy acrylate did not develop affinity for each other, and the water dispersion could not be formed.

It was therefore learned that a self-emulsifiable epoxy acrylate could not be obtained when the weight ratio of the epoxy resin to the acrylic resin was 95:5 in the epoxy acrylate.

[COMPARATIVE EXAMPLE 12]

112 Parts of a solution containing 62.5% of a copolymerized epoxy resin CE-3 was heated at 123° C. in a nitrogen stream with stirring in the same manner as in Example 1. Then, the monomer, and a premixed solution of benzoyl peroxide and butyl carbitol used in Example 3 were dropwisely added thereto in an amount of 3/2 of Example 3 over a period of 60 minutes. The mixture was further maintained for 15 minutes to polymerize the epoxy acrylate. Then, 8 parts of a solution containing 50% of resol phenolic resin of a bisphenol-F RP-2 was added thereto and was homogeneously dissolved therein, followed by the addition of 9 parts of dimethylethanolamine. The heating was discontinued simultaneously with the start of addition, and the mixture was left to cool with stirring for 3 minutes. Then, 100 parts of distilled water was added thereto with vigorous stirring at 300 rpm. After the temperature was cooled down to lower than 60° C., another 80 parts of distilled water was added thereto. 10 Parts of n-butanol (which contained small amounts of water and other solvents) was removed from the obtained water dispersion, the solid component and viscosity were adjusted with water containing 30% of dimethylethanolamine and with distilled water, thereby to prepare an aqueous paint containing 25% of a solid component and having a viscosity of 478 cps.

The obtained aqueous paint exhibited good dispersion property and dispersion stability.

A coated plate was prepared in the same manner as in Example 1 to evaluate the coating properties. The retort elution was 19.5 ppm, and a strong retort whitening tendency was exhibited. Even in the feathering testing, feathering developed in 7 cans among 10 cans. In the corrosion resistance testing, all 10 cans were corroded to a serious degree.

It was therefore learned that as the weight ratio of the epoxy resin to the acrylic resin becomes 70:30 in the epoxy acrylate, the coating elutes to a serious degree, exhibits greatly deteriorated resistance against water, adhesiveness and workability, and loses corrosion resistance to a conspicuous degree.

[COMPARATIVE EXAMPLE 13]

80 Parts of an epoxy resin (trade name: Epikote 1010) (Mn: 7910, Mw: 39500) produced by Yuka-Shell Epoxy Co., and 48 parts of a mixture solvent containing 50% of an n-butanol, 33% of a butyl cellosolve and 17% of a propylene glycol-n-butyl ether, were fed into the reactor that was used in Example 1, heated at 120° C. with stirring, and were dissolved over a period of 2 hours. 20 Parts of a monomer mixture containing 45% of methacrylic acid, 40% of styrene, 10% of methyl methacrylate and 5% of ethyl acrylate, and a premixed solvent of 1.9 parts of 75% benzoyl peroxide and 10 parts of butyl carbitol, were dropwisely added thereto in a nitrogen stream with stirring over a period of 60 minutes. Even after the dropwise addition has been finished, the mixture was maintained for 15 minutes to polymerize the epoxy acrylate. Then, 18 parts of a resol phenolic resin prepared from a bisphenol-A RP-4 and a p-cresol was added and was homogeneously dissolved therein, followed by the addition of 5 parts of dimethylaminoethanol. The heating was discontinued simultaneously with the start of addition, and the mixture was stirred for 3 minutes and was uniformalized. Thereafter, while vigorously stirring at 300 rpm, 200 parts of distilled water was continuously added thereto over a period of 10 minutes to prepare a water dispersion. 20 Parts of n-butanol (containing small amounts of water and other solvents) were removed from the obtained water dispersion, and the solid component and the viscosity were adjusted with water containing 30% of dimethylethanolamine and with distilled water. The obtained aqueous paint contained 25% of a solid component and possessed a viscosity of 443 cps.

No abnormal condition was observed in the dispersion testing using the #14 bar coater or in the dispersion stability testing relying upon the preservation at room temperature for one month, and good results were obtained.

The coated plate was prepared in the same manner as in Example 1, and various coating properties were tested. In the retort elution testing, however, potassium permanganate was consumed in an amount of 53.9 ppm which was a very poor result. In the retort whitening testing, the whole surface changed into white and in the feathering testing, feathering developed in all 10 cans to a conspicuous degree. Even in the corrosion resistance testing, all 10 cans were corroded to a great degree, and pitting developed in 4 cans.

The Epikote 1010 is an epoxy resin of bisphenol-A obtained from a liquid epoxy resin of bisphenol-A and the bisphenol-A through the two-stage polymerization method.

[EXAMPLE 7]

By using the reactor used in Example 1, 68 parts of a solution containing 62.5% of a copolymerized epoxy resin CE-7 was heated at 120° C. with stirring. Then, 15 parts of a monomer mixture containing 65% of methacrylic acid, 34% of styrene and 1% of ethyl acrylate, and a mixture solution of 0.56 parts of 75% benzoyl peroxide and 5 parts of butyl carbitol, were dropwisely added thereto over a period of 45 minutes. After the dropwise addition has been finished, the reaction was continued for another 15 minutes. Then, 68 parts of a solution containing 62.5% of the copolymerized epoxy resin CE-7 was added thereto and was homogeneously mixed and dissolved therein over a period of 10 minutes. Then, 4 parts of a solution containing 50% of a resol phenolic resin of bisphenol-F RP-1 was added thereto and was homogeneously dissolved therein, followed by the addition of 5 parts of dimethylethanolamine. After the amine has been added, heating was discontinued and the mixture was cooled down to 110° C. over a period of 5 minutes. Then, 100 parts of distilled water was added thereto with vigorous stirring at 300 rpm. After the temperature was cooled down to lower than 60° C., another 75 parts of distilled water was added thereto. 17 Parts of n-butanol (containing small amounts of water and other solvents) was removed from the water dispersion, the solid component and the viscosity were adjusted with water containing 30% of dimethylethanolamine and with distilled water to prepare an aqueous paint containing 30% of solid component and having a viscosity of 437 cps.

No abnormal condition was found in the dispersion testing using the #14 bar coater and in the dispersion stability testing relying upon the preservation at room temperature for one month, and good results were obtained.

A coated plate was prepared in the same manner as in Example 1 to evaluate a variety of coating properties. The retort elution was as very excellent as 2.9 ppm. Good results were also obtained even in the retort whitening testing, feathering testing and corrosion resistance testing.

The above-mentioned results are shown in Table 5. In Table 5, the tested results of dispersion property and dispersion stability are both indicated as dispersion property.

TABLE 1

[Bisphenol-F]

| Bisphenol-F | Catalyst | pH | Purity of binuclide | o-o type | o-p type | p-p type |
|---|---|---|---|---|---|---|
| F-1 | HCl | 2.0 | 99% or more | 4 | 47 | 48 |
| F-2 | $Mg^{2+}$ | 5.0 | 99% or more | 19 | 42 | 38 |
| F-3 | $Zn^{2+}$ | 5.0 | 99% or more | 26 | 58 | 15 |
| F-4 | $Zn^{2+}$ | 5.0 | 88% | 23 | 52 | 13 |

TABLE 2

[Liquid epoxy resin]

| Liquid resin No. | Starting bisphenol | Mn | EEW g/eg | Viscosity (25° C.) poises |
|---|---|---|---|---|
| LER-1 | Bisphenol A (polycarbonate-grade) | 350 | 178 | 110 |
| LER-2 | Bisphenol-F (F-2) | 336 | 170 | 80 |

TABLE 3

[Copolymerized Epoxy Resin]

| Copolymerized epoxy No. | Molar ratio of Starting resins LER1/LER2/bisF (No)/bisA | Bis A/F ratio | Mn | Mw | Mw/Mn | EEW g/eg | Mn/EEW | Percentage of low mol. components (%) |
|---|---|---|---|---|---|---|---|---|
| CE-1 | 5/0/1 (F-2)/4 | 9/1 | 13700 | 84900 | 6.2 | 15500 | 0.88 | 2.3 |
| CE-2 | 5/0/3 (F-2)/2 | 7/3 | 11200 | 61800 | 5.5 | 12400 | 0.90 | 1.7 |
| CE-3 | 5/0/5 (F-2)/0 | 5/5 | 12500 | 65400 | 5.2 | 11900 | 1.05 | 1.4 |
| CE-4 | 5/2/5 (F-2)/0 | 3/7 | 8800 | 53600 | 6.1 | 10200 | 0.86 | 2.3 |
| CE-5 | 5/0/5 (F-3)/0 | 5/5 | 16300 | 102700 | 6.3 | 28000 | 0.58 | 1.4 |
| CE-6 | 5/0/5 (F-3)/0 | 5/5 | 13900 | 70900 | 5.1 | 19600 | 0.71 | 1.4 |
| CE-7 | 5/0/5 (F-3)/0 | 5/5 | 10500 | 47300 | 4.5 | 8900 | 1.18 | 1.5 |
| CE-8 | 5/0/5 (F-3)/0 | 5/5 | 9200 | 40100 | 4.4 | 7600 | 1.21 | 1.6 |
| CE-9 | 5/0/5 (F-3)/0 | 5/5 | 7300 | 29200 | 4.0 | 4500 | 1.62 | 3.0 |
| CE-10 | 5/0/3 (F-1)/2 | 7/3 | 12600 | 70500 | 5.6 | 14300 | 1.13 | 2.2 |
| CE-11 | 0/5/0 /5 | 5/5 | 9800 | 69500 | 7.1 | 19200 | 0.51 | 2.4 |
| CE-12 | 0/5/5 (F-2)/0 | 0/10 | 9300 | 75600 | 8.1 | 17900 | 0.52 | 2.4 |

TABLE 4

[Resol Phenolic Resin]

| Phenolic resin No. | Synthesizing condition Kind of phenol | Molar ratio Phemol/formalin/catalyst | Temp.-time °C.-hrs | Molecular weight Mn | Mw |
|---|---|---|---|---|---|
| RP-1 | bisF (F-2) | 1/6/1.5 | 60-2 | 730 | 830 |
| RP-2 | bisF (F-3) | 1/6/1.5 | 50-2 | 700 | 780 |
| RP-3 | bisF (F-4) | 1/6/1.5 | 50-2 | 790 | 950 |
| RP-4 | bisA/p-cresol = 1/1 | 1/5/1 | 70-1.5 | 690 | 880 |

TABLE 5

[Properties of Paint and Coating Properties]

| Ex. No. Comp. Ex. No. | Epoxy resin No. | Curing agent No. | Epoxy/acrylic/ curing agent | BPO/ monomer (%) | Solid component (%) | Viscosity (25° C.) (cps) |
|---|---|---|---|---|---|---|
| Ex. 1 | CE-2 | RP-1 | 85/15/2 | 3.5 | 30 | 455 |
| Ex. 2 | CE-3 | RP-1 | 85/15/2 | 3.5 | 30 | 420 |
| Ex. 3 | CE-6 | RP-2 | 80/20/4 | 4.9 | 28 | 388 |
| Ex. 4 | CE-7 | RP-2 | 80/20/4 | 4.9 | 28 | 409 |
| Ex. 5 | CE-8 | RP-2 | 80/20/4 | 4.9 | 28 | 462 |
| Ex. 6 | CE-3 | RP-3 | 85/15/6 | 3.5 | 30 | 463 |
| Ex. 7 | CE-7 | RP-1 | 80/15/2 | 2.8 | 30 | 437 |
| Copm. Ex. 1 | CE-1 | RP-1 | 85/15/2 | 3.5 | 30 | dilatancy |
| Comp. Ex. 2 | CE-4 | RP-1 | 85/15/2 | 3.5 | 30 | 461 |
| Comp. Ex. 3 | CE-5 | RP-2 | 80/20/4 | 4.9 | 28 | 359 |
| Comp. Ex. 4 | CE-9 | RP-2 | 80/20/4 | 4.9 | 28 | 478 |
| Copm. Ex. 5 | CE-10 | RP-1 | 85/15/2 | 3.5 | 30 | dilatancy |
| Comp. Ex. 6 | CE-11 | RP-1 | 85/15/2 | 3.5 | 30 | 466 |
| Copm. Ex. 7 | PKHH | RP-1 | 85/15/2 | 3.5 | 30 | dilatancy |
| Comp. Ex. 8 | CE-12 | RP-1 | 85/15/2 | 3.5 | 30 | 495 |
| Comp. Ex. 9 | CE-3 | RP-1 | 85/15/10 | 3.5 | 28 | 421 |
| Comp. Ex. 10 | CE-3 | none | 85/15/0 | 3.5 | 30 | 435 |
| Copm. Ex. 11 | CE-3 | RP-1 | 95/5/2 | 3.5 | | not dispersed |
| Comp. Ex. 12 | CE-3 | RP-2 | 70/30/4 | 4.9 | 25 | 478 |
| Comp. Ex. 13 | E1010 | RP-4 | 80/20/9 | 7.1 | 25 | 443 |

| Ex. No. Comp. Ex. No. | Dispersion property | Retort elution KMnO₄ (ppm) | Retort whitening | Feathering | Working, corrosion resistance |
|---|---|---|---|---|---|
| Ex. 1 | ○ | 5.7 ○ | ○ | 0/10 ○ | 0/10 ○ |
| Ex. 2 | ○ | 3.8 ○ | ○ | 0/10 ○ | 0/10 ○ |
| Ex. 3 | ○ | 6.2 ○ | ○ | 0/10 ○ | 0/10 ○ |
| Ex. 4 | ○ | 6.9 ○ | ○ | 0/10 ○ | 0/10 ○ |
| Ex. 5 | ○ | 7.8 ○ | ○ | 0/10 ○ | 0/10 ○ |
| Ex. 6 | ○ | 9.1 ○ | ○ | 0/10 ○ | 0/10 ○ |
| Ex. 7 | ○ | 2.9 ○ | ○ | 0/10 ○ | 0/10 ○ |
| Comp. Ex. 1 | × | 14.8 × | × | not evaluated | not evaluated |
| Comp. Ex. 2 | Δ | 15.5 × | Δ | 0/10 ○ | 2/10 × |
| Comp. Ex. 3 | × | 5.3 ○ | ○ | 0/10 ○ | 10/10 × |
| Comp. Ex. 4 | ○ | 23.5 × | × | 0/10 ○ | 8/10 × |
| Comp. Ex. 5 | × | 13.6 × | × | not evaluated | not evaluated |
| Comp. Ex. 6 | ○ | 13.2 × | ○ | 0/10 ○ | 2/10 × |
| Comp. Ex. 7 | × | 18.4 × | × | not evaluated | not evaluated |
| Comp. Ex. 8 | ○ | 15.2 × | Δ | 0/10 ○ | 3/10 × |
| Comp. Ex. 9 | ○ | 23.2 × | ○ | 0/10 ○ | 8/10 × |
| Comp. Ex. 10 | ○ | 2.7 ○ | × | 10/10 × | 10/10 × |
| Comp. Ex. 11 | × | | | | |
| Comp. Ex. 12 | ○ | 19.5 × | × | 7/10 × | 10/10 × |
| Comp. Ex. 13 | ○ | 53.9 × | × | 10/10 × | 10/10 × |

Baking condition: PMT240° C., pass time 20 sec
Amount of coating: 110 mg/dm²
BPO/monomer: Amount of BPO (benzoyl peroxide) used for the graft-polymerization, expressed by (amount of BPO used/amount of monomer) × 100.

Table 6 shows the following data as reference materials.

TABLE 6

| Epoxy resing | Supplier | Bis A/F ratio | Mn | Mw | Mw/Mn | EEW g/eg | Mn/EEW | Percentage of low mol. Components |
|---|---|---|---|---|---|---|---|---|
| PKHH | Phenoxy associate | 10/0 | 12400 | 65800 | 5.3 | 26000 | 0.48 | 2.4 |
| E1010 | Yuka-shell epoxy | 10/0 | 7910 | 39500 | 5.0 | — | — | 2.8 |

According to the present invention, an aqueous paint comprises an epoxy acrylate resin prepared by modifying, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2, and a curing agent of a thermosetting resin having a methylol group. The aqueous paint exhibits improved dispersion property in the water and dispersion stability, enables the painting operation to be efficiently carried out, cures at low temperatures within short periods of time, forms the coating which after cured exhibits high degree of workability, high corrosion resistance, and elutes out little into the content. The paint can be adapted to coil-coating the can closures.

What is claimed is:

1. An aqueous paint comprising
   (A) an epoxy acrylate resin prepared by modifying, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2, said bisphenol-F being a composition at least 60 mole % of which comprises a bisphenol-F having an ortho-ortho or ortho-para methylene bond, and
   (B) a curing agent or a thermosetting resin having a methylol group.

2. An aqueous paint according to claim 1, wherein said copolymerized epoxy resin is obtained by the polycondensation of
   (1) a diglycidyl ether of a bisphenol-A, and
   (2) a bisphenol F or a mixture of the bisphenol-F and the bisphenol-A.

3. An aqueous paint according to any of claim 1, wherein said copolymerized epoxy resin comprises less than 2% by weight of a component having a molecular weight of not more than 1,000.

4. An aqueous paint according to any of claim 1, wherein said copolymerized epoxy resin has an average number of epoxy groups of 0.6 to 1.5 per a molecule.

5. An aqueous paint according to any of claim 1, wherein said epoxy acrylate resin (A) comprises an epoxy acrylate resin obtained by graft-polymerizing an ethylenically unsaturated monomer comprising a (meth)acrylic acid as an essential component onto said copolymerized epoxy resin.

6. An aqueous paint according to claim 5, wherein said ethylenically unsaturated monomer is a composition comprising
   (i) 60 to 70% by weight of a (meth)acrylic acid,
   (ii) 30 to 40% by weight of a styrene, and
   (iii) less than 1% by weight of an ethyl acrylate.

7. An aqueous paint according to any of claim 1, wherein said epoxy acrylate resin (A) comprises an epoxy resin component and acrylic resin component at a weight ratio of 90:10 to 75:25.

8. An aqueous paint according to any of claim 1, wherein said curing agent of a thermosetting resin (B) comprises a resol phenolic resin.

9. An aqueous paint according to claim 8, wherein said resol phenolic resin is obtained by the polycondensation of a bisphenol F and a formaldehyde.

10. An aqueous paint according to claim 8 or 9, wherein said resol phenolic resin is present in an amount of 0.5 to 7 parts by weight per 100 parts by weight of the epoxy acrylate resin (A).

11. An aqueous paint comprising
   (A) an epoxy acrylate resin prepared by graft-polymerizing, with a (meth)acrylic monomer, a copolymerized epoxy resin having a number average molecular weight of 8,000 to 15,000 and containing, as phenolic components, a bisphenol-A component and a bisphenol-F component at a molar ratio of from 5:5 to 8:2, said bisphenol-F being a composition at least 60 mole % of which comprises a bisphenol-F having ortho-ortho or ortho-para methylene bond, and
   (B) a curing agent of a thermosetting resin having a methylol group.

* * * * *